Aug. 2, 1960

O. W. RITCHER ET AL 2,947,937

TEST SET FOR CHECKING RELAYS

Filed Sept. 30, 1957

INVENTORS
ORLANDO W. RICHTER
JOHN C. SUGG, JR.

BY *G. D. O'Brien*
*Q. Baxter Warner*
ATTORNEYS

United States Patent Office 2,947,937
Patented Aug. 2, 1960

2,947,937

TEST SET FOR CHECKING RELAYS

Orlando W. Richter, Steelton, Pa. (2727 Jasper St. SE., Washington, D.C.), and John C. Sugg, Jr., 2604 Branch Ave. SE., Washington 20, D.C.

Filed Sept. 30, 1957, Ser. No. 687,309

8 Claims. (Cl. 324—28)

(Granted under Title 35, U.S. Code (1952), sec. 266)

The invention described herein may be manufactured and used by or for the Government of the United States of America for governmental purposes without the payment of any royalties thereon or therefor.

This invention relates to an apparatus for testing protective devices used in electric power circuits or machines and more particularly to portable testing apparatus for testing time delay protective relays in power plants without resorting to cumbersome circuitry.

It is often desirable in power plants to test and adjust, locally, circuit breaker operating time delay relays of the type which operate after a predetermined period of overcurrent, overvoltage or undervoltage in the power system. Such relays function to energize and trip out a circuit breaker in a malfunctioning power system after a predetermined number of cycles of alternating current power. Various of the protective relays in a system are adjusted such that circuit breakers in a more remote part of the system operate before breakers nearer the main power plant or higher rated substation. This is so that as little of a system as possible is disabled by the malfunction. For example, if an overcurrent relay in a main power plant is adjusted to operate the main power plant circuit breaker after 60 cycles of overcurrent, a similar overcurrent relay in an adjacent substation might well be adjusted to operate its circuit breaker in 57 cycles or 57/60th of one second. Thus, it is insured that the remote substation will be cut out of the circuit at a time before circuit breaking action occurs in the main power plant.

Heretofore when it was desired to test the time delayed operation of such a protective relay, it was necessary to set up bulky testing apparatus for energizing the relay in an overload or underload condition while the operation of this relay was timed to determine how many cycles were required for it to operate. Previous equipment was thus time consuming in testing, requiring a special hookup for each test, and generally consumed heavy power requiring fuze protection in the magnitude of 100 amps.

It is therefore an object of this invention to provide a small portable unitary protective relay testing device.

It is another object of this invention to provide an improved protective relay testing device which requires no more than 5 amp. service from convenient outlet.

It is a further object of this invention to provide an improved protective relay testing device which is convenient and safe to use and uncomplicated to operate.

It is another object of this invention to provide an improved protective relay testing device which incorporates, in one portable unit, means for testing overcurrent, overvoltage, undervoltage, power differential, and phase differential power plant relays.

In accordance with the invention there is provided a metering system and voltage or current adjusting system for supplying and monitoring energy supplied to the operating coil of a protective relay, while a cycle registering timer records the number of cycles the relay thus energized takes to operate. Timer operation is initiated coincident with the moment at which energization of the relay operating coil takes place. Switching means is provided for changing from overcurrent relay testing operation to the testing of undervoltage relays and the like.

The invention will be described with reference to the accompanying drawings wherein:

Fig. 3 is a circuit diagram of an undervoltage protective relay of the type to be tested by the subject invention.

Figure 1:
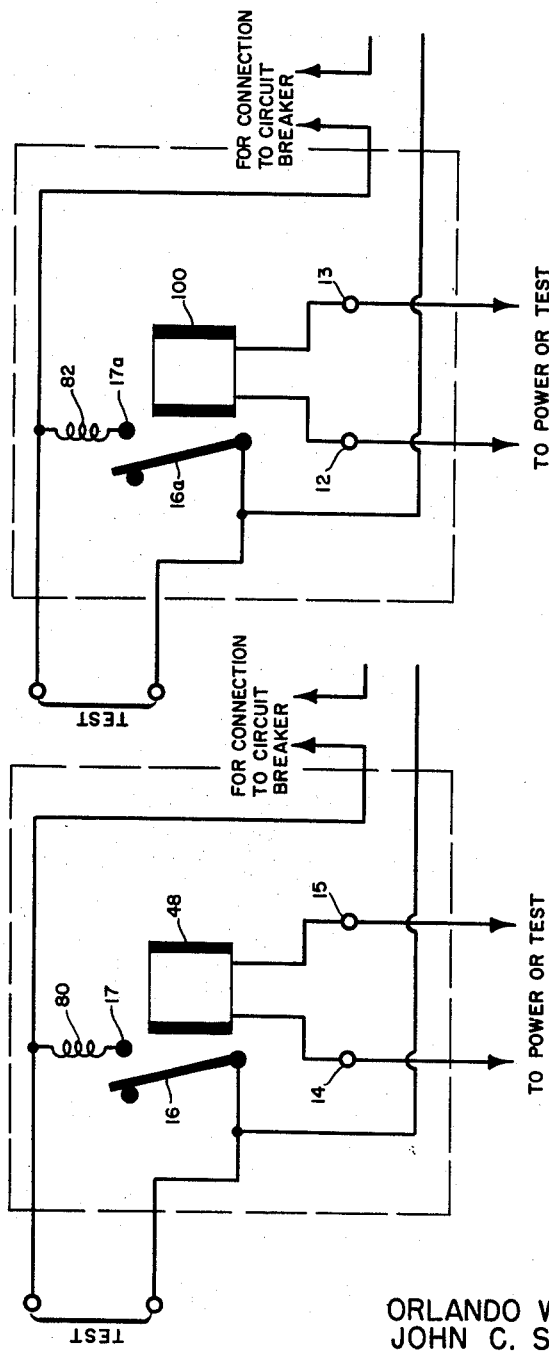
Fig. 1 is a circuit diagram of an overcurrent protective relay of the type to be tested.

Referring to Fig. 1, the overcurrent relay shown employs an operating coil 48 and has normally open contacts 16 and 17. The contacts would normally form a series circuit with target operating coil 80, the line to the circuit breaker operating coil, and a 110 volt control source. The circuit breaker coil and 110 volt source are not connected to the relay during testing operation. Coil leads 14 and 15 would normally be connected to a current transformer in the power system line to detect an overcurrent condition. These leads are connected to the test set during testing operation.

Fig. 3 shows an undervoltage relay similar to the afore-mentioned overcurrent relay. The relay includes an operating coil 100 having leads 12 and 13 which would normally be connected to a transformer across the line to be protected or other source of voltage. These leads are connected to the subject test during testing operation. Operating coil 100 operates to close normally open contacts 16a and 17a which form a series circuit with target operating coil 82. Similarly, this relay is disconnected from the circuit breaker during testing operation.

Figure 2:
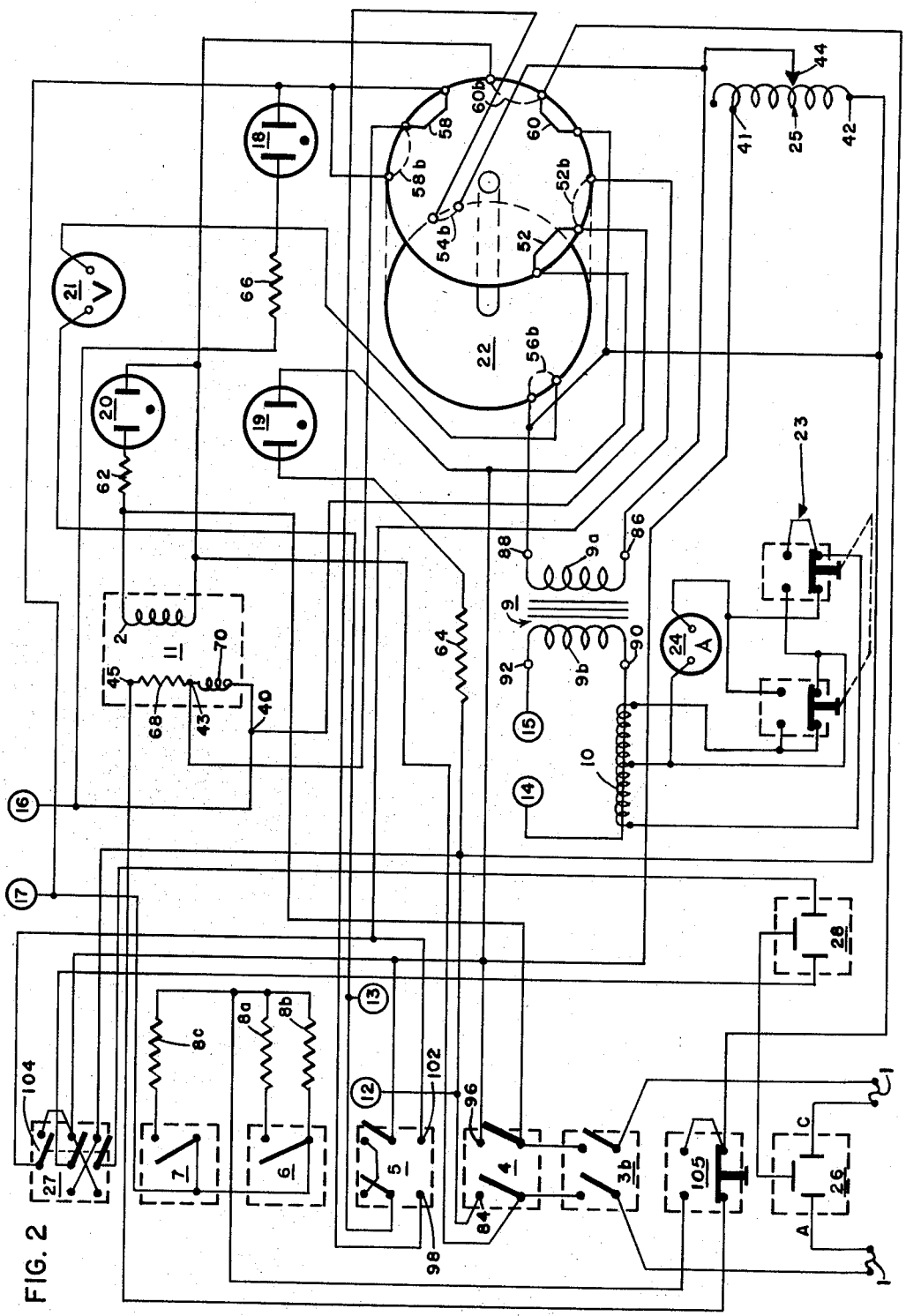
Fig. 2 is a circuit diagram of one embodiment of the invention.

Referring now to Fig. 2, showing an embodiment of the invention, switch 22 is shown in the overcurrent relay testing position as represented by closed contacts 52, 58, 60.

Single phase power is obtained from a convenient source such as across connections A and C of three phase outlet 26. Fuzes 1, for example 5 amp. fuzes, are inserted between outlet 26 and master off-on switch 3l from which power is further coupled to the movable contacts of testing switch 4. White neon light 20 in series with limiting resistor 62 is paralleled with the afore-mentioned movable contacts to give an indication of power on. Also in parallel with these contacts is synchronous motor field 2 of timer 11.

Red neon light 19 in series with limiting resistor 64 is paralled with the fixed contacts 84 and 96 of testing switch 4 in order to give an indication of a test in progress. These fixed contacts 84 and 96 also couple power to input connections 41 and 42 of voltage control Variac 25, the movable arm of which is connected to primary terminal 86 of transformer 9. The other primary lead of transformer 9, lead 88, is returned to connection 42 of Variac 25. Thus, it appears that the setting of Variac 25 controls the current through primary winding 9a of transformer 9 and therefore the secondary current in winding 9b of transformer 9. The secondary winding 9b, connected to test terminals 14 and 15, is for the purpose of feeding current to the operating coil of a relay under test, for example coil 48 of Fig. 1. The line between terminal 90 of the transformer and output terminal 14 has coupled thereto a current transformer 10. Current transformer 10 connects to ammeter scale changing switch 23 and thence to ammeter 24 for indicating the current flowing from terminals 14 and 15 of the apparatus to the relay operating coil under test. In the switch position shown, the meter 24 reads on a 50 amp. scale for example, whereas in the closed position of switch 23 the meter 24 reads on a 5 amp. scale, for example, thereby providing for accurate readings.

Timer 11 is constructed to count or register the number of cycles of 60 cycle alternating current which occurs between the time that synchronous motor field 2 and clutch operating coil 70 are together energized, and the time that clutch operating coil 70 is de-energized. This clutch operating coil 70 has paralleled thereacross output terminals 16 and 17 of the subject invention which in turn are connected to correspondingly numbered contacts of the relay to be tested as shown in Fig. 1. It thus appears that when the contacts of the relay under test close, simulating an underload or overload condition, the contacts will short out timer clutch coil 70 and stop the timer thus completing a time measurement. Clutch coil 70 is energized simultaneously with synchronous field 2 by means of operating the testing switch 4 inasmuch as terminal 40 of clutch coil 70 is returned to terminal 96 of switch 4 through closed contact 52 of selector switch 22. The other side of clutch coil 70 is returned to terminal 84 of testing switch 4 through the series resistor 68 and the normally closed contacts of push button 105. Clear neon bulb 18 in series with resistor 66 is placed across trip circuit terminals 16 and 17 in order to indicate when the relay has tripped. The light will go out when the relay trips.

Push button 105 is employed to reduce the amount of resistance in the circuit between the test set source of power and the trip coil of the relay under test. Target coils 80 or 82 shown in Figs. 1 and 3, would be thus more readily energized so that an indication would be given at the relay under test of the closure of its contacts. The indication is by means of targets (not shown) operated by coils 80 or 82. Pressing normally closed push button 105 closes the open contacts thereof to complete a circuit from terminal 84 of the testing switch through contact 60 of the selector switch, push buttom 105 and resistors 8a, 8b and 8c to output terminal 17. Varying amounts of resistance may be selected by switches 6 and 7.

Rotary selector switch 22 is for the purpose of switching from an overcurrent relay test to an undervoltage relay test. The connections on the switch shown as solid lines are the connections completed for the overcurrent test. Those connections shown by broken lines indicate those completed when the switch is switched to a "voltage" test.

For testing an undervoltage relay, for example, the relay shown in Fig. 3, the output terminals 12 and 13 of the subject apparatus are connected to the operating coil of the relay under test. Terminals 14 and 15 are not used. For commencing the test the voltage switch 5 is placed in a downward position. The movable terminal 44 of Variac 25 is then connected through selector switch terminal 54b and terminal 98 of switch 5 to output terminal 13. Terminal 12 of the subject apparatus is returned to the other side of the Variac. Voltmeter 21 is paralled across terminals 12 and 13 to register the voltage applied to a relay under test. Its circuit is completed to terminal 12 through terminal 56b of selector switch 22. Power is simultaneously coupled to the clutch coil of the timer through selector switch terminals 52b and 60b during the undervoltage relay test. The upper shorted contacts of switch 5 are for the purpose of resetting undervoltage relay coils and the like through terminals 12 and 13.

The subject apparatus has an outlet 28 for the purpose of testing three phase differential power directional or phase differential relays. For testing such relays the operating coils thereof are connected to outlet 28 while the contacts are connected to terminals 16 and 17. Selector switch 22 is placed in the "voltage" position. Reversing switch 27 reverses the voltage from the test set's source of power 26 to the outlet 28. Reversing the switch 27 from the left-hand to the right-hand position also closes contacts 104 thereof completing the power circuit to clutch coil 70 in the timer through selector switch contacts 52b.

Referring now to overcurrent relay testing operation, the leads 14 and 15 in the test set, shown diagrammatically in Fig. 2, are plugged into terminals 14 and 15 of a relay coil as shown in Fig. 1. The current through the coil 48 can be selected at any desired level by adjusting Variac 25. The invention includes a counting device 11 for counting the number of cycles which elapse before the contacts of the relay under test close. Terminals 16 and 17 of Fig. 2 are connected to the relay contacts 16 and 17 of Fig. 1 so that when the relay under test operates, the clutch coil 70 of timer 11 is effectively shorted out. This stops the timer which registers a certain number of cycles thus indicating the operating time of the relay. Power from an external source such as a conventional wall plug-in point as the three phase power source indicated in Fig. 2 at 26 is applied through 5 amp fuzes 1 to the movable contacts of double-pole single-throw toggle switch 3b, and is further applied through testing switch 4 to supply an input voltage across synchronous motor field 2 in timer 11. White lamp 20 indicates power in the circuit. Closure of the testing switch 4 simultaneously applies voltage to the "primary" winding, points 41 and 42 of Variac 25. Power is also supplied to the clutch coil 70 of the timer through testing switch 4. Red lamp 19 indicates when switch 4 is closed. The voltage applied across Variac 25 causes a voltage to appear between slide contact 44 of the Variac and point 42 of the Variac, in accordance with the predetermined setting of the slide contact 44. This voltage appearing between points 44 and 42 energizes the primary of transformer 9, the secondary of which is connected between output terminals 14 and 15 for supplying test power to the operating coil of a tested relay. The current thereby supplied coil 48 of Fig. 1 can thus be set by the Variac 25 of Fig. 2 to a desired value such that the current through coil 48 is equivalent to a current in the same coil during a power system overload being a higher current than is consumed by the tester due to the action of the transformers. Transformer 9 may be an appropriate ratio, that is to step up the current. Actual operating conditions are simulated wherein the current through coil 48 would, after a predetermined number of cycles, cause contacts 16 and 17 to trip, in turn operating a circuit breaker to cut its related substation out of the system.

As soon as testing switch 4 was turned on in the presence of a proper setting of the Variac 25, the cycle counter or the timer 11 commenced counting, giving a numerical value of the time at which contacts 16 and 17 close. A visible digital numeral or dial number is arranged to appear on the face of the instrument indicating the actual number of cycles which elapse before the relay is tripped by the simulated overload. If the cycle count is too high, for example 62 cycles instead of a desired 57, an adjustment on the turn coil (not shown) of the relay can be manipulated to a position such that the tripping occurs at the desired time. An ammeter 24 is provided to give an indication of the amount of current through operating coil 48, so that the Variac may be properly set.

The subject apparatus may also be used for testing undervoltage or overvoltage relays. In utilizing the circuit for this second function, points 16 and 17 are connected across the contacts 16a and 17a of an undervoltage relay as shown in Fig. 3, and points 12 and 13 of the subject test set are connected across coil 100 of the relay. Throwing the selector switch 22 to a voltage testing position closes the contacts shown in broken line and cuts the overcurrent relay testing apparatus, hereinbefore described, out of the circuit. A.C. voltmeter 21 and the output points 12 and 13 are inserted into the circuit. With the testing switch 4 in the closed or up ward position, voltage is applied to the primary or input of Variac 25, which voltage is tapped off by means of slide contact 44, and this voltage is registered on voltmeter 21. The voltage is applied across points 12 and 13 when switch 5 is in a downward position. Varying the Variac will thus cause the voltage across points 12 and 13, connected to operating coil 100 in Fig. 3, to vary from 0 to 300 volts.

When it is desired to measure the time the relay requires to close its contacts 16a and 17a, the voltage switch 5 is closed to its downward position, thus connecting coil 100 to the Variac as well as cutting the cycle counter 11 into the circuit by applying voltage across clutch coil 70 through resistor 68. This starts the cycle counter operating as hereinbefore described and the counter continues to operate until the closing of the contacts 16a and 17a of the relay effectively shorts out clutch coil 70.

A target testing circuit is provided for operation, both for the overcurrent relay and the undervoltage relay described. Momentary depression of switch 105 will cause the resistor 8a to be placed in series with output point 17. Under the afore-mentioned simulated conditions and using the test apparatus as hereinbefore described the target provided on a relay under test would not actually drop from the coil contact disposed between points 16 and 17. Therefore, to insure the dropping of this target under simulated load conditions, the button 105 is depressed momentarily to cause a lesser amount of resistance 8a to be cut into the circuit. Current can therefore be supplied in quantity sufficient to cause the target to drop so that a person using the apparatus may have an indication that contacts 16 and 17 or 16a and 17a have actually closed and that the relay must be reset. This pin points the operated relay and its controlled circuit breaker which must be tripped before normal substation operation may be resumed. The switches 6 and 7 are provided to select additional parallel resistors 8b and 8c which may be required in order that trip coils and targets of differing electrical characteristics will be operated.

It will be readily appreciated by those skilled in the art that the voltage test for undervoltage relays may be used with equal facility for testing overvoltage relays by merely causing the Variac to be set to a different position. In testing an overvoltage relay, it is not necessary to use the shorting contacts at the top of voltage switch 5 in order to reset the relay.

Additional circuitry is provided for checking three phase differential power directional or phase differential relays, and under such conditions switch 27 is used as a phase differential switch. By throwing switch 27 from a left-hand to a right-hand position, when the operating coil of a differential power directional or phase differential relay is connected to output 28, the relay's contacts connected between terminals 16 and 17 will stop the timer by shorting out the timer clutch coil 70 when the relay under test has operated. Contacts 104 of reversing switch 27 simultaneous connect the timer clutch coil 70 in the circuit.

Obviously many modifications and variations of the present invention are possible in the light of the above teachings. It is therefore to be understood that within the scope of the appended claims the invention may be practiced otherwise than as specifically described.

What is claimed is:

1. A portable apparatus for testing circuit breaker overcurrent relays comprising a circuit including a plug receptacle for connection to a source of power, a cycle counter and timer in said circuit having a clutch coil for operating said counter, a variable autotransformer having primary connections to said source receptacle and having secondary connections with terminals adapted for connection to energize a circuit breaker relay operating coil, a line between said secondary connections and one of said terminals, said clutch coil having terminals adapted in parallel with the contacts on said circuit breaker relay so that closure of said contacts will short out said clutch coil and stop the counter, a resistance in series with said clutch coil, an operating switch serially interposed between said source receptacle and said primary connections, said switch also being interposed between said source receptacle and the series combination of said clutch coil and resistance, a current transformer coupled to said line, and an ammeter energized from said current transformer, whereby the time in cycles for an overcurrent relay to operate for selected values of current may be determined.

2. A portable apparatus for testing circuit breaker voltage sensitive relays comprising a source of power, a cycle counter, a cycle timer having a clutch for operating said counter and a clutch coil, a variable autotransformer having primary connections and having secondary connections with terminals adapted for connection to energize a circuit breaker relay operating coil, said clutch coil having terminals adapted for connection in parallel with the contacts on said circuit breaker relay so as to be shorted out by closure of said contacts to stop said counter, a resistance in series with said clutch coil, an operating switch serially interposed between said source of power and said primary connections, said switch also being interposed between said source of power and the series combination of said clutch coil and resistance, and a voltmeter connected across said secondary connections, whereby the time in cycles for a voltage sensitive relay to operate for selected values of voltage may be determined.

3. A portable apparatus for testing circuit breaker overcurrent operating relays comprising a source of power, a counter operated by a clutch from a cycle timer having a clutch coil to maintain the operation of said counter, a Variac having primary connections and having secondary taps connected to energize the primary of a transformer, said transformer having a secondary winding with terminals adapted for connection to energize a circuit breaker operating coil, a line between said secondary winding and one of said terminals, said clutch coil having terminals adapted for connection in parallel with the contacts on a circuit breaker overcurrent relay, a resistance in series with said clutch coil, an operating switch serially interposed between said source of power and said primary connections, said switch also being interposed between said source of power and the series combination of said clutch coil and resistance, a current transformer coupled to said line, and an ammeter connected to said current transformer, whereby the time in cycles for an overcurrent relay to operate for selected values of current may be determined.

4. The apparatus as recited in claim 3 having additional terminals adapted for connection to the operating coil of a voltage sensitive relay, and having means for switching said secondary taps from said primary of said transformer to said additional terminals, and having a voltmeter connected across said terminals whereby said apparatus may be switched to additionally test voltage sensitive relays.

5. The apparatus as recited in claim 4 having three phase power input terminals and three phase testing output terminals, one of said input terminals being connected to one of said output terminals, the remaining two input terminals supplying the said source of power for said apparatus, and a reversing switch connected between said remaining two input terminals and the remaining two output terminals, whereby the operation time in cycles for a differential relay having its operating coil connected to said three phase testing output terminals may be additionally determined.

6. A portable apparatus for testing circuit breaker relays comprising: a receptacle for connection to a source of electric power; a first pair of terminals for connection to the operating winding of a relay under test; a second pair of terminals for connection to the contacts of the relay under test; a timer having indicating means, an operating motor, and having a clutch for transmitting mechanical power from said operating motor to said indicating means, said clutch having an operating coil; connections supplying electric power from said receptacle to said operating coil and said motor; an impedance changing transformer having a primary with connections to said receptacle and having a secondary coupled to said first pair of terminals; and means connecting said second pair of terminals across said operating coil of said clutch so that closure of the relay contacts will short out said operating coil of said clutch and cause said indicating means to cease operating.

7. A portable apparatus for testing circuit breaker relays comprising: a receptacle for connection to a source of electric power; a first pair of terminals for connection to the operating winding of a relay under test; a second pair of terminals for connection to the contacts of the relay under test; a timer having indicating means, an operating motor, and having a clutch for transmitting mechanical power from said operating motor to said indicating means, said clutch having an operating coil; connections supplying electric power from said receptacle to said motor; connections supplying electric power from said receptacle to said operating coil; a dropping resistor inserted in series with said last mentioned connections; an impedance changing transformer having a primary with connections to said receptacle and having a secondary coupled to said first pair of terminals; means connecting said second pair of terminals across said operating coil of said clutch so that closure of the relay contacts will short out said operating coil of said clutch; and common switching means inserted between said receptacle and said transformer primary and said operating coil to energize them simultaneously.

8. A portable apparatus for testing circuit breaker relays which have a winding and contacts comprising: a power receptacle; impedance changing means between said receptacle and said winding; a timer having indicating means, a motor, and a clutch mechanically coupling said indicating means and said motor; means for simultaneously energizing said clutch and said relay winding; and electrical means operated by said contacts for disengaging the clutch on said timer by electrically shunting it; whereby the time of operation of said relay may be ascertained.

References Cited in the file of this patent

G. A. Thompson: "Relay Test Set," Electrical Review, June 2, 1944; pages 775–776.

E. J. Emmerling: "Portable Set Tests O C Relays," Electrical World, July 27, 1953; page 100.